W. A. & R. T. SMITH.
Adjustable-Stool.
No. 226,252. Patented April 6, 1880.
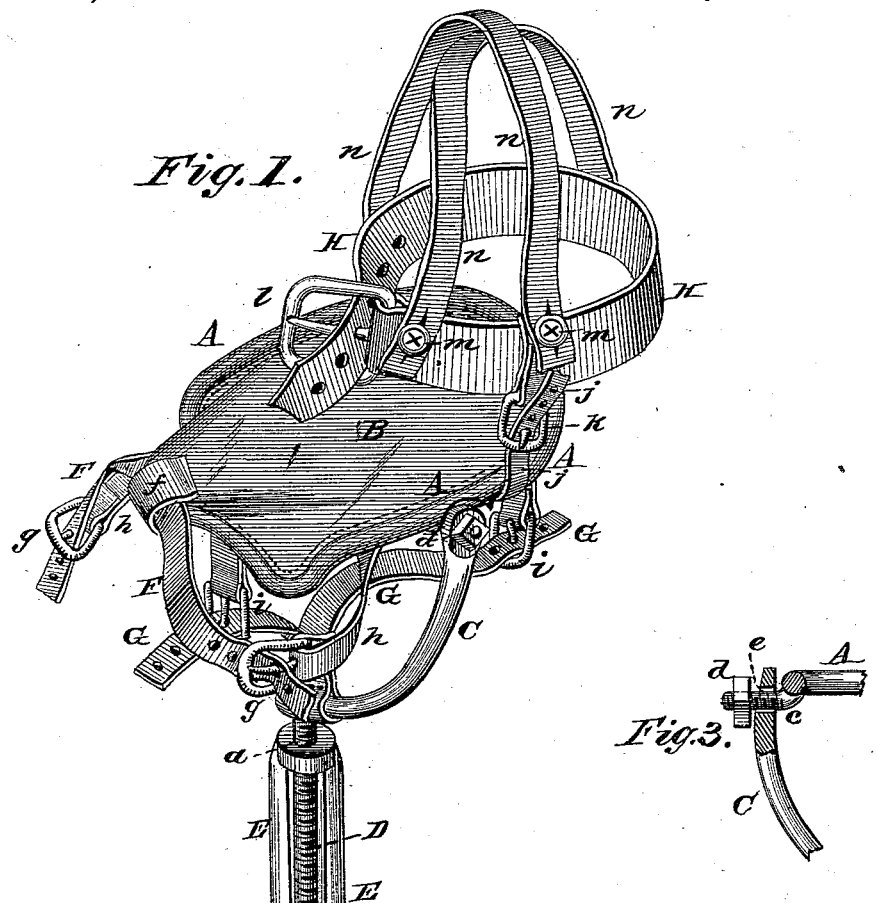
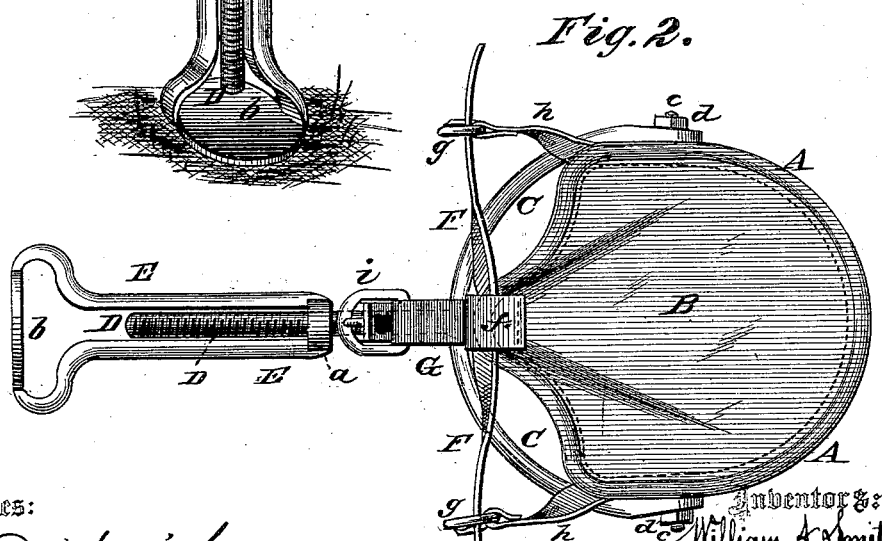

UNITED STATES PATENT OFFICE.

WILLIAM A. SMITH AND ROBERT T. SMITH, OF WAXAHACHIE, TEXAS.

ADJUSTABLE STOOL.

SPECIFICATION forming part of Letters Patent No. 226,252, dated April 6, 1880.

Application filed November 18, 1879.

*To all whom it may concern:*

Be it known that we, WILLIAM A. SMITH and ROBERT T. SMITH, of Waxahachie, in the county of Ellis and State of Texas, have invented certain new and useful Improvements in Adjustable Stools; and we do hereby declare that the following is a full, clear, and exact description of the invention, which will enable others skilled in the art to which it appertains to make and use the same, reference being had to the accompanying drawings, and to the letters of reference marked thereon, which form a part of this specification.

This invention relates to an improvement in adjustable stools; and it consists in the construction and arrangement of parts, as will be hereinafter more fully set forth, and pointed out by the claim.

In the annexed drawings, which fully illustrate my invention, Figure 1 is a perspective view. Fig. 2 is a plan view of the device folded, and Fig. 3 is a detail.

Like letters of reference indicate like parts.

A represents the seat-frame, made of metal, and bent in the desired form, and covered with any suitable material, B.

C represents a support for the leg, pivoted to the frame A at its sides.

D represents a screw-threaded rod, rigidly attached to the support C, as shown, and on which the leg E is adjusted up or down. The said leg E is provided with a screw-threaded opening, $a$, at its top, and an enlarged base, $b$. The bolt D passes between the two standards of the leg E, and is thereby protected by them.

The pivot for attaching the frame A to the support C consists of an arm, $c$, rigidly secured to and extending out from the frame A, and provided with a screw-thread to receive a nut, $d$. The arm $c$ is passed through an opening, $e$, in the end of the support and the nut screwed down, which holds the support in the desired position.

F represents the leg-strap, which passes through a loop, $f$, at the front of the seat, and is adjusted by means of the buckles $g$, attached to short tabs $h$, said tabs being attached to the under side of the seat.

G represents a supporting-strap attached to the pivoted support C, and adjusted by means of buckles $i$ $i$, as shown.

$j$ $j$ are straps attached to the rear of the seat, and to which the supporting-belt H is attached by means of buckles $k$ $k$. Said belt H is provided with a buckle or other suitable device, $l$, for tightening and loosening the same. This belt H is provided with buttons $m$, to which suspenders $n$ may be attached, which tend to more perfectly support the seat on the person. For ordinary purposes the belt alone will answer.

In operation, the legs of the operator are inclosed by the strap F, which can be adjusted as desired. The belt is passed around the waist, and, if desired, the suspenders attached and passed over the shoulders. The device, when attached to the person, is in the position shown in Fig. 2.

When the operator desires to assume a stooping position the leg E is thrown down, and is held straight by the supporting-strap G, when the body can be supported on the seat and the work done in a sitting position, which relieves the muscles of the great strain now occasioned by working in a stooping position while picking berries, cotton, &c.

The device can be easily and cheaply constructed, and is not liable to get out of repair.

Having thus fully described our invention, what we claim as new, and desire to secure by Letters Patent, is—

The seat A B, provided with support C, pivoted thereto, rod D, leg E, supporting-strap G, belt H, straps F $n$ $h$, and buckles $g$ $k$ $l$, whereby the seat may be secured to the person and operated substantially in the manner and for the purpose specified.

In testimony that we claim the foregoing as our own we have hereto affixed our signatures in presence of two witnesses.

WILLIAM ALEXANDER SMITH.
ROBERT TOUMBLESON SMITH.

Witnesses:
 WILEY N. STREND,
 JOSEPH H. SMITH.